US008594288B2

(12) United States Patent
Robbins et al.

(10) Patent No.: US 8,594,288 B2
(45) Date of Patent: Nov. 26, 2013

(54) APPARATUS AND METHOD FOR RETRIEVING CONTACT INFORMATION ASSOCIATED WITH A PARTY

(75) Inventors: William S. Robbins, Sun Prairie, WI (US); R. Tyler Wallis, Dallas, TX (US); Anup D. Karnalkar, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1232 days.

(21) Appl. No.: 12/330,412

(22) Filed: Dec. 8, 2008

(65) Prior Publication Data

US 2010/0142691 A1  Jun. 10, 2010

(51) Int. Cl.
*H04M 11/00* (2006.01)
*H04M 1/56* (2006.01)
*H04M 15/06* (2006.01)
*H04M 1/00* (2006.01)

(52) U.S. Cl.
USPC .............. 379/142.06; 379/93.23; 379/142.17; 379/354

(58) Field of Classification Search
USPC ............. 379/142.01, 142.06, 142.15, 142.16, 379/142.17, 352, 354, 355.04, 355.09, 379/356.01, 357.05; 455/414.1, 415, 517, 455/425
See application file for complete search history.

(56) References Cited

U.S. PATENT DOCUMENTS

| 6,738,462 | B1 | 5/2004 | Brunson |
| 6,782,086 | B2 | 8/2004 | Clapper |
| 7,187,932 | B1 | 3/2007 | Barchi |
| 2003/0185366 | A1* | 10/2003 | Duncan ..................... 379/142.17 |
| 2004/0066920 | A1* | 4/2004 | Vandermeijden .......... 379/88.19 |
| 2004/0093317 | A1* | 5/2004 | Swan ................................ 707/1 |
| 2005/0157857 | A1 | 7/2005 | Lockwood |
| 2006/0177039 | A1 | 8/2006 | Caballero-McCann et al. |
| 2008/0075251 | A1* | 3/2008 | Jefferson et al. ......... 379/142.07 |
| 2008/0102819 | A1* | 5/2008 | Bengtsson et al. ............ 455/425 |
| 2008/0228736 | A1* | 9/2008 | Brandt et al. ..................... 707/3 |
| 2008/0261568 | A1* | 10/2008 | Lopez et al. ................ 455/414.1 |
| 2010/0142688 | A1* | 6/2010 | Karnalkar et al. ......... 379/93.17 |
| 2011/0142219 | A1* | 6/2011 | Liou ........................ 379/142.06 |

OTHER PUBLICATIONS

Microsoft, "Using the Automatic Name Fill-In Feature (AutoComplete", Microsoft Office Outlook, 5 pages, http://office.microsoft.com/en-us/outlook/HA100978871033.aspx, web site last visited Dec. 4, 2008.
Robbins et al., "Method and Apparatus for Presenting Communication Identifiers", U.S. Appl. No. 12/059,920, dated Mar. 31, 2008; 34 pages.
Robbins et al., "Method and Apparatus for Selecting Communication Identifiers", U.S. Appl. No. 12/113,394, dated May 1, 2008; 35 pages.

* cited by examiner

*Primary Examiner* — Binh Tieu
(74) *Attorney, Agent, or Firm* — Ralph Trementozzi; Guntin & Gust, PLC (57) ABSTRACT

A system that incorporates teachings of the present disclosure may include, for example, a communication device having a controller to detect by way of an input device an entry of a communication identifier without contact information of a party associated with the communication identifier, retrieve from a database operating externally to the communication device contact information of the party according to the communication identifier, initiate a communication session according to the communication identifier, present at least a portion of the retrieved contact information and the communication identifier, and store the communication identifier in a communication log with the retrieved contact information. Other embodiments are disclosed.

25 Claims, 6 Drawing Sheets

APPARATUS AND METHOD FOR RETRIEVING CONTACT INFORMATION ASSOCIATED WITH A PARTY

FIELD OF THE DISCLOSURE

The present disclosure relates generally to communication techniques and more specifically to a apparatus and method for retrieving contact information associated with a party.

BACKGROUND

It is common today for communication devices such as landline and mobile phones to display a caller's identification (commonly referred to as caller ID). The caller's ID can include the name and/or telephone number of the person or company initiating the call. Based on a caller's ID, the party can determine whether or not s/he would like to answer the call or allow the call to be directed to a voicemail service.

DETAILED DESCRIPTION

One embodiment of the present disclosure can entail a communication device having a controller to detect by way of an input device an entry of a communication identifier without contact information of a party associated with the communication identifier, retrieve from a database operating externally to the communication device contact information of the party according to the communication identifier, initiate a communication session according to the communication identifier, present at least a portion of the retrieved contact information and the communication identifier, and store the communication identifier in a communication log with the retrieved contact information.

Another embodiment of the present disclosure can entail a computer-readable storage medium having computer instructions to initiate a communication session according to a communication identifier associated with a party, retrieve from a database operating independently of the storage medium contact information of the party according to the communication identifier, and present at least a portion of the retrieved contact information and the communication identifier while one of initiating the communication session and conducting the communication session.

Yet another embodiment of the present disclosure can entail a device having a controller to receive from a communication device a communication identifier associated with a party, retrieve contact information of the party according to the communication identifier, and transmit to the communication device the contact information, wherein the communication device presents at least a portion of the retrieved contact information and the communication identifier while one of initiating a communication session according to the communication identifier and conducting the communication session.

Another embodiment of the present disclosure can entail conducting a reverse directory lookup of a communication identifier while one of initiating and conducting a communication session according to the communication identifier.

Figure 1:
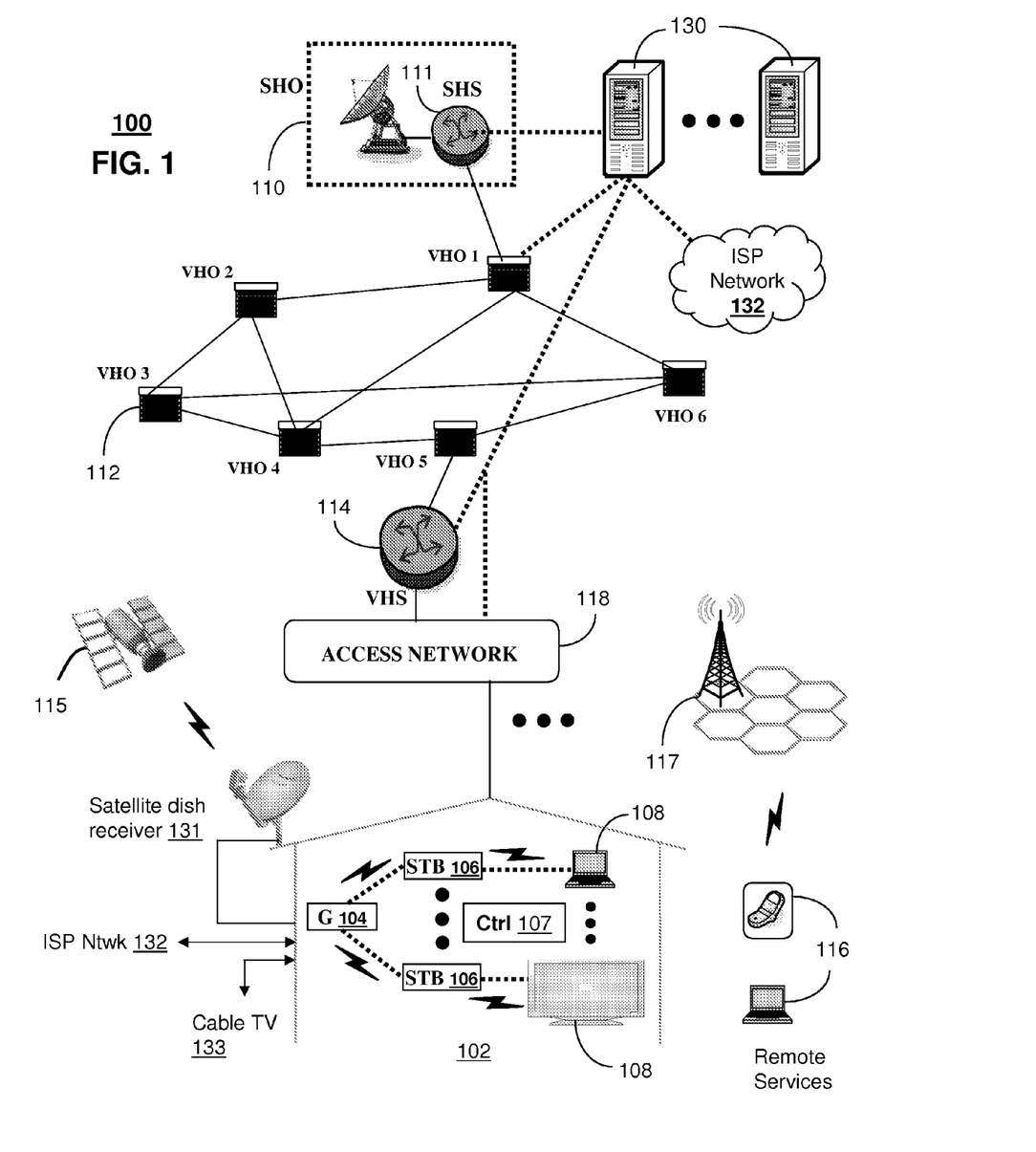
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can be utilized as a reverse directory lookup database (herein referred to as RDL_DB 130) operating as a server that remotely provides reverse directory lookup services to the communication devices of communication system 100 as well as other communication devices of other communication systems. The communication devices and the RDL_DB 130 are therefore separate devices operating remotely from each other. The RDL_DB 130 can utilize common database technology store subscriber information. The subscriber information can include a name of a party, an address of the party, a landline phone number of the party, a mobile phone number of the party, an email address of the party, a session initiation protocol uniform resource identifier (SIP URI) of the party, an instant messaging address of the party, a short messaging system (SMS) address of the party, and a multimedia messaging system (MMS) address of the party, just to mention a few. The RDL_DB 130 can be accessed by the communication devices of FIG. 1 as will be described by way of the illustrative method 500 of FIG. 5.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
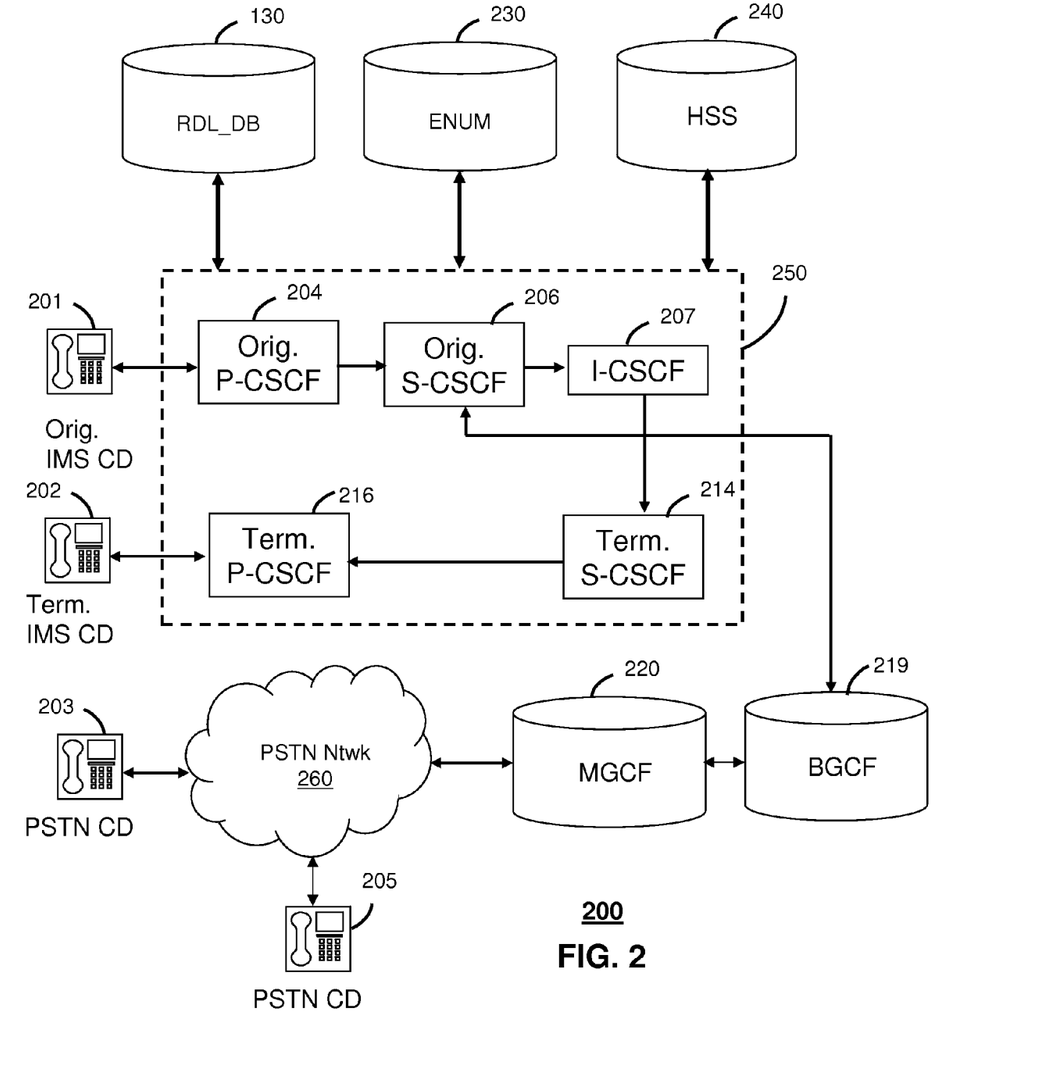

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The RDL_DB 130 of FIG. 1 can be operably coupled to the second communication system 200 for purposes similar to those described above.

Figure 3:
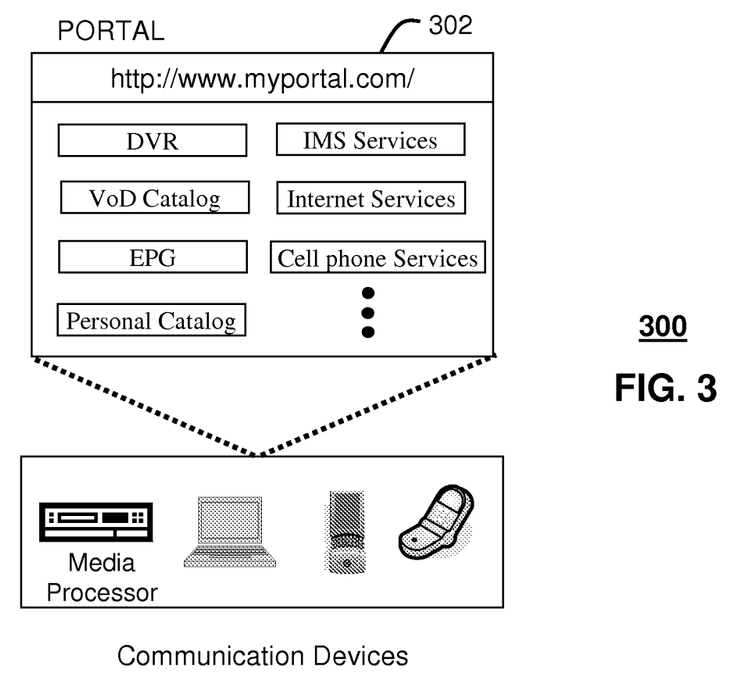
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
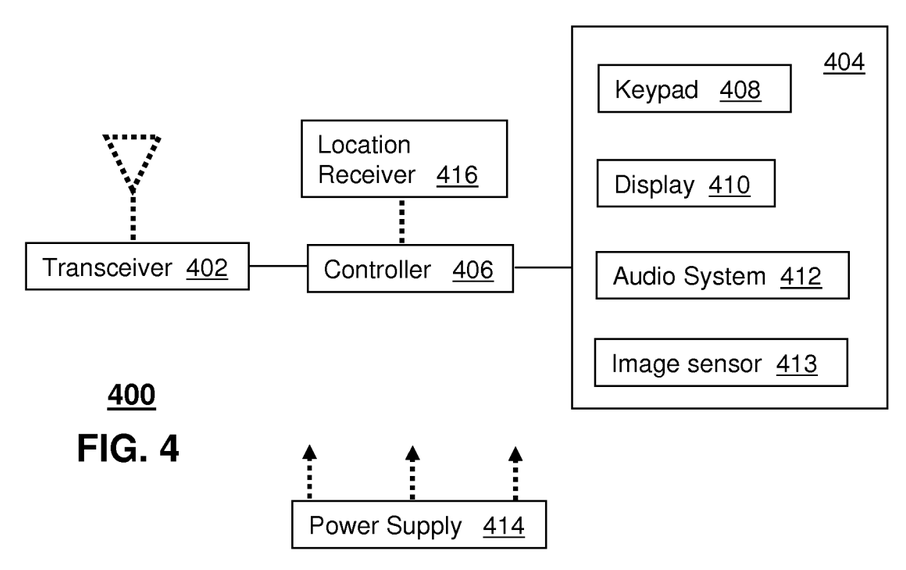
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
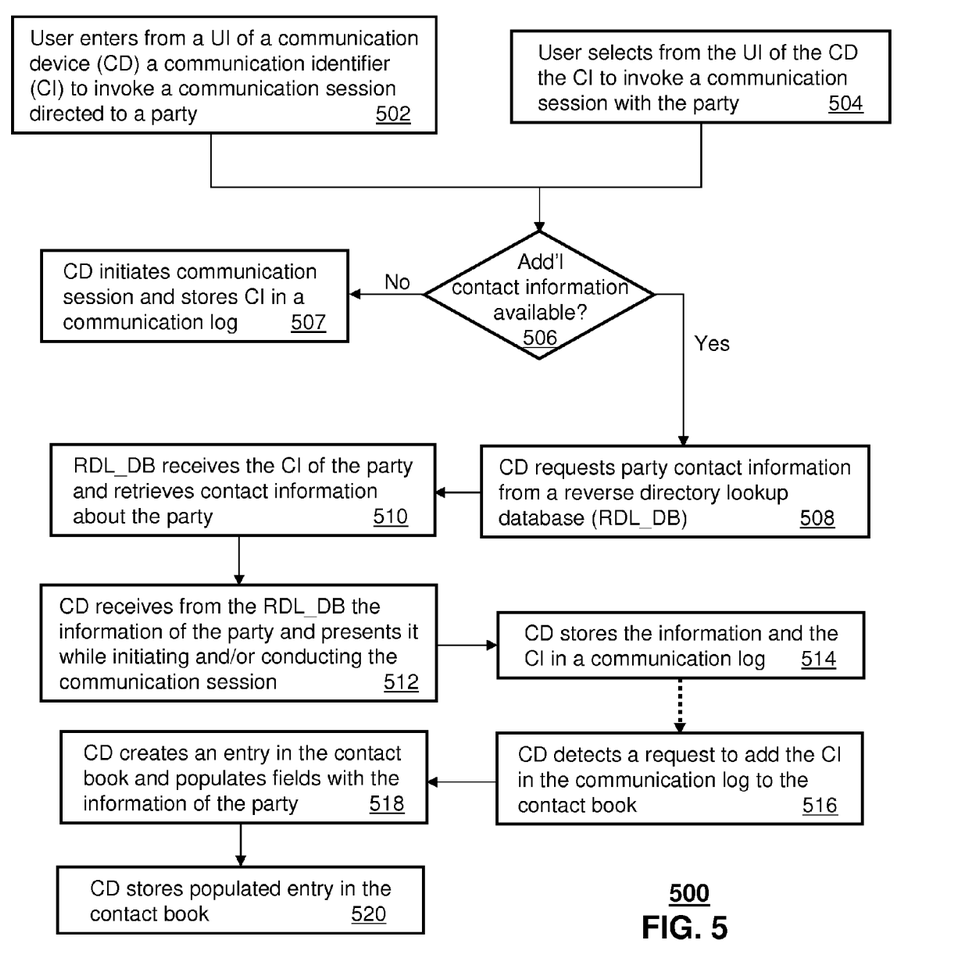
FIG. 5 depicts an illustrative embodiment of a method according to the present disclosure.
Figure 6:
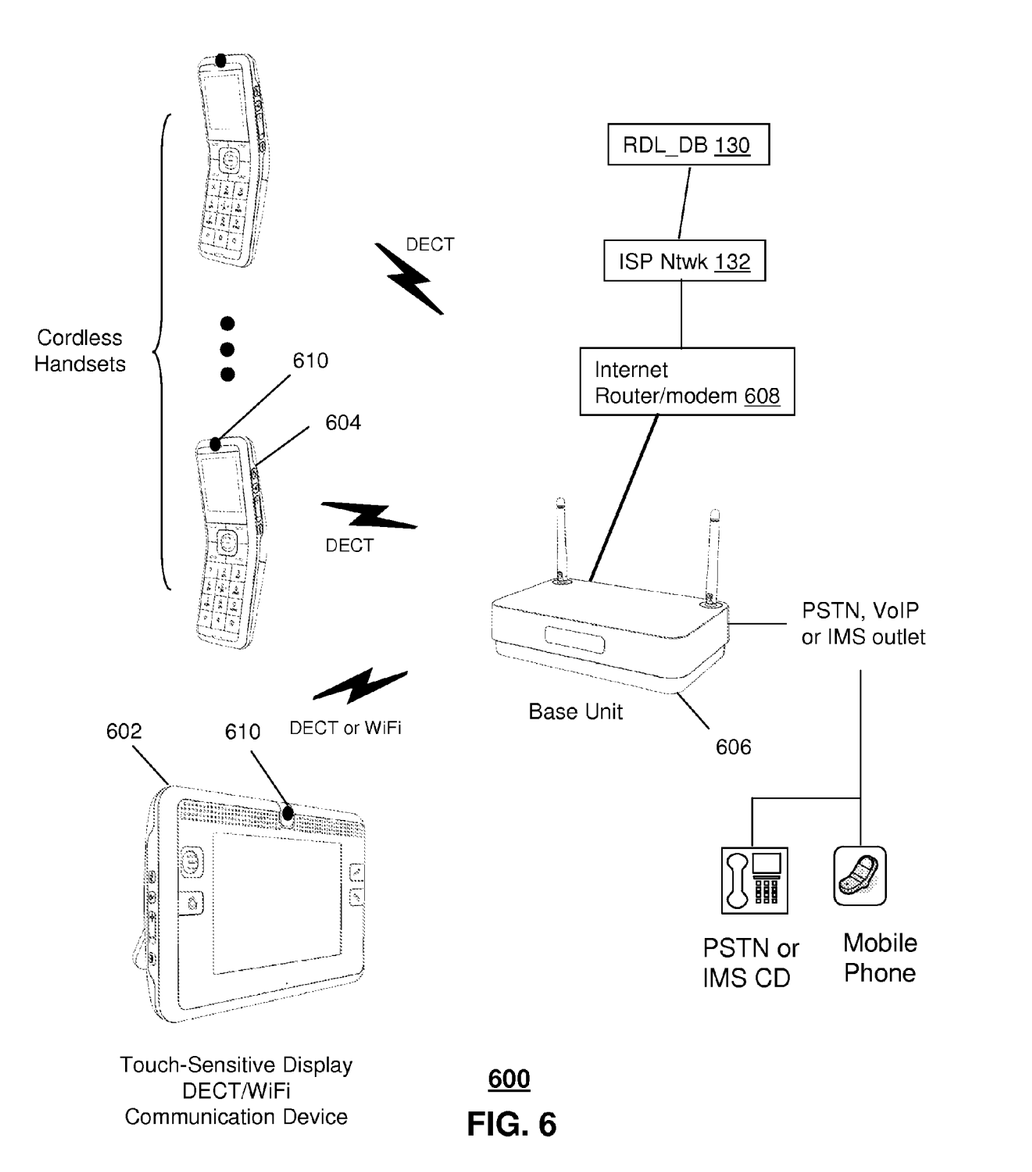
FIG. 6 depicts an illustrative embodiment of communication devices operating according to the method of FIG. 5.

FIG. 5 depicts an illustrative a method 500 operating in portions of the aforementioned communication systems. FIG. 6 shows an illustrative embodiment of communication devices operating according to method 500. Block diagram 600 comprises a landline communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the ISP network 132 and the RDL_DB 130. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures.

With the configuration of FIG. 6 in mind, method 500 can begin with step 502 in which a user enters by way of a user interface of a communication device such as the touch-sensitive display of the tablet 602 a communication identifier to invoke a communication session directed to a party. The communication identifier can represent an E. 164 number of the party, a SIP URI of the party, an email address of the party, a short messaging system (SMS) address of the party, a multimedia messaging system (MMS) address of the party, or an instant messaging (IM) address of the party. The user can enter the communication identifier via a graphical user interface (UI) of the tablet 602 such as a touch-sensitive number keypad or Qwerty keypad. Alternatively, the user can select within the UI of the tablet 602 in step 504 the communication identifier to invoke a communication session. This step can represent for example a selection of a communication identifier from a communication log presented by the tablet 602 by way of the UI. The communication log can represent a log of phone numbers or SIP URIs from incoming communications accepted by the user. The log can also represent an inbox of email messages, SMS messages, MMS messages, instant messaging messages received by the user.

In step 506, the tablet 602 can determine if the communication identifier of either steps 502 or 504 lacks contact information of the party associated with the communication identifier by determining whether additional contact information can be identified by the RDL_DB 130. The additional contact information found in step 506 can be for example the name of the party, a home or office street address of the party, or any other contact information of the party such as a personal or work email address, a mobile phone number, an office phone number, a home phone number, or an IM address, just to mention a few. In step 506, the tablet 602 can be programmed to determine if additional contact information is available in the RDL_DB 130 by supplying the communication identifier of the party to the RDL_DB to invoke a search.

If no additional contact information is available or the party has a privacy policy applied to his/her account so that the RDL_DB 130 does not share contact information of the party, then the tablet 602 can proceed to step 507 where it initiates the communication session (PSTN, IMS, email, mobile, or otherwise) directed to the party and stores the communication identifier in a communication log without additional contact information of the party. If the tablet 602 finds additional contact information of the party in step 506, the tablet can proceed to step 508 where it requests the party's additional information from the RDL_DB 130. Once the RDL_DB 130 receives the communication identifier of the party in step 510, the RDL_DB locates a subscriber account of the party that matches the communication identifier and retrieves the additional contact information of the party.

The communication identifier used to index the RDL_DB 130 can be a phone number, a SIP URI, an email address, or any other communication identifier associated with the party. The extent of contact information shared by the party with others can be managed by the party. For example, the party can establish a contact information sharing policy with the service provider of the RDL_DB 130. The policy established by the user and the service provider can make the contact information of the party available in whole or in part, and according to an identification (such as caller ID, subscriber account no, etc.) of the user requesting the information from the RDL_DB 130.

Once the RDL_DB 130 has located contact information of the party, the tablet 602 can be programmed in step 512 to receive the contact information from the RDL_DB and present it to the user by way of the UI of the tablet while initiating and/or conducting the communication session. In this step for instance the tablet 602 can present the party's name (if provided by the RDL_DB 130) which may not have been previously available with the communication identifier (e.g., home phone number) while initiating the communication session. In step 514, the tablet 602 can be programmed to store the additional contact information along with the communication identifier in a communication log of outgoing communication sessions. If the party's name is available, the communication log can present the new entry with the party's name only, the party's name with an icon indicating the type of communication identifier(s) available (home phone, mobile phone, email, SMS, etc.), or the party's name and the communication identifier.

In the future when the user selects the updated communication identifier of the party from the communication log, the tablet 602 can present the additional contact information (home phone, mobile phone, email, SMS, etc.) to the user before the communication session is initiated. With the additional contact information presented, the user can continue using the communication identifier previously selected or decide to utilize a different communication identifier (e.g., switch from email to mobile phone number).

Once the contact information of the party and the communication identifier has been stored in the communication log in step 514, the tablet 602 can be programmed as a background process (indicated by the dashed line pointing to step 516) to detect a request to add the communication identifier to the contact book. This step can be the result of the user selecting a soft button presented with the communication log (such as "Add to Contacts") while highlighting one or more communication identifier entry in the communication log. In step 518, the tablet 602 can be programmed to create with common techniques an entry in the contact book, and automatically populate fields with the contact information of the party supplied by the RDL_DB 130.

The population step can be implemented with tags associated with portions of the contact information supplied by the RDL_DB 130. For example, the RDL_DB 130 can tag portions of contact information to identify a home phone number, an office phone number, a personal email address, an SMS address, an IMS address, and so on. By tagging portions of the contact information, the tablet 602 can readily populate fields of the contact book entry created in step 518. In this same step, the user can be presented with the populated fields for review. The user can add more contact information, modify fields of contact information, and/or choose to store the entry of the contact book as shown, which invokes step 520 where the tablet 602 stores the populated entry in the contact book. The selection to store can also be performed by a soft button provided with the contact book entry presented (e.g., "Save and Close").

Upon reviewing the aforementioned embodiments, it would be evident to an artisan with ordinary skill in the art that said embodiments can be modified, reduced, or enhanced without departing from the scope and spirit of the claims described below. Method 500 can be adapted so that a communication device automatically queries the RDL_DB 130 for all communication identifiers recorded by the communication device for incoming communication sessions, and stores additional contact information found by the RDL_DB as an updated entry in the communication log. In this manner, the user of the communication device can have at his/her disposal entries in the communication log that can provide alternative means for communication and/or a name of the party associated with the communication identifier. Method 500 can also be applied to any communication device including without limitation mobile phones, PDAs, and computers.

Other suitable modifications can be applied to the present disclosure without departing from the scope of the claims below. Accordingly, the reader is directed to the claims section for a fuller understanding of the breadth and scope of the present disclosure.

Figure 7:
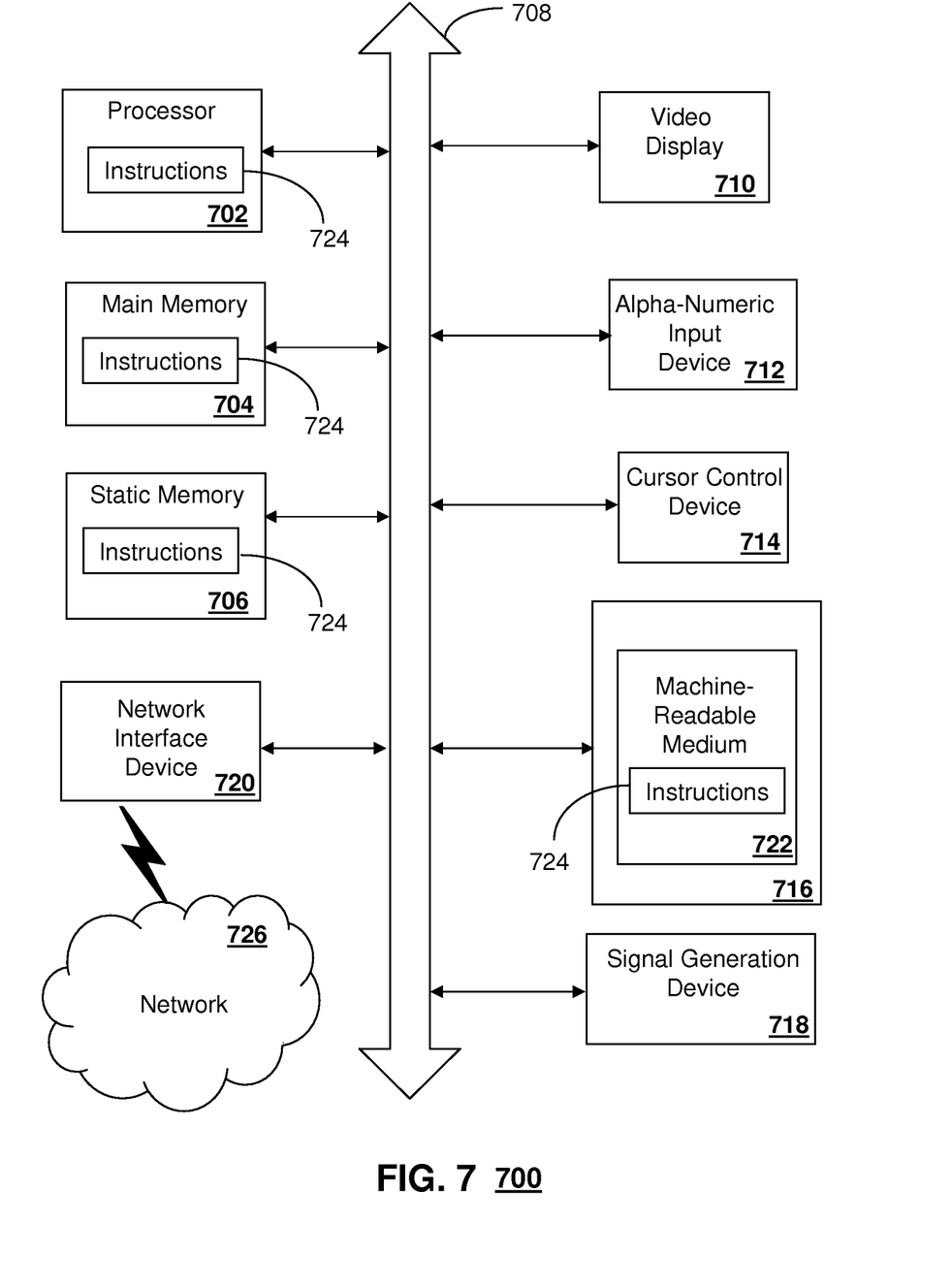
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a memory to store instructions; and
a controller coupled to the memory, wherein the controller, responsive to executing the instructions, performs operations comprising:
receiving an incoming communication originating from equipment of a first party;
recording in a local incoming communication log a first communication identifier of the first party;
retrieving, in response to the receiving of the incoming communication, contact information of the first party from a database operating externally to the communication device;
presenting at least a portion of the contact information of the first party and the first communication identifier of the first party;
storing in the local incoming communication log, updated contact information associated with the first party comprising the first communication identifier and the contact information of the first party;
detecting a request to store the updated contact information associated with the first party in a contact book;
retrieving the updated contact information associated with the first party from the local incoming communication log;
storing in the contact book the updated contact information associated with the first party;
detecting a subsequent entry of the first communication identifier of the first party; and
presenting, in response to the detecting of the subsequent entry of the first communication identifier of the first party, the updated contact information associated with the first party before initiating a second communication session, wherein the second communication session is initiated according to the updated contact information associated with the first party.

2. The communication device of claim 1, wherein the storing of the updated contact information associated with the first party comprises:
  populating fields of a first entry in the contact book, resulting in a populated first entry of the contact book, with the contact information of the first party and the first communication identifier; and
  presenting the populated first entry of the contact book.

3. The communication device of claim 2, comprising a keyboard input device from which the communication identifier can be entered, and wherein the controller responsive to executing the instructions, performs operations comprising storing the populated entry in the contact book.

4. The communication device of claim 1, wherein the operations further comprise:
  detecting an entry of a second communication identifier of a second party;
  receiving a request to add the second communication identifier of the second party in the contact book;
  determining a lack of contact information of the second party in the local incoming communication log;
  retrieving from the database operating externally to the communication device the contact information of the second party according to the second communication identifier of the second party;
  populating fields of a second entry in the contact book with the contact information of the second party and the second communication identifier, resulting in a populated second entry of the contact book; and
  presenting the populated second entry of the contact book.

5. The communication device of claim 4, wherein the operations further comprise presenting the second communication identifier by way of a portion of the local incoming communication log.

6. The communication device of claim 4, wherein the operations further comprise storing the populated second entry in the contact book.

7. The communication device of claim 1, wherein the database corresponds to a reverse directory lookup system.

8. The communication device of claim 1, wherein the contact information of the first party is selected from a group consisting of: a name; an address; a landline phone number; a mobile phone number, an email address; a session initiation protocol uniform resource identifier, an instant messaging address; a short messaging system address; a multimedia messaging system address; and combinations thereof.

9. The communication device of claim 1, wherein the communication device is selected from a group consisting of: a landline phone; a mobile phone; a computer; a set-top box; and combinations thereof.

10. The communication device of claim 1, wherein the communication device is operable in a communication system selected from a group consisting of: a public switched telephone network communication system; a voice over Internet protocol communication system; a communication system; a cable television communication system; a satellite television communication system; an Internet protocol multimedia subsystem communication system; and combinations thereof.

11. A machine-readable storage device, comprising instructions which, responsive to being executed by a processor, cause the processor to perform operations comprising:
  receiving an incoming communication originating from equipment of a first party;
  recording in a local incoming communication log a first communication identifier of the first party;
  retrieving, in response to the receiving of the incoming communication, contact information of the first party from a database operating independently of the storage device;
  storing in the local incoming communication log, updated contact information associated with the first party comprising the first communication identifier and the contact information of the first party; detecting a request to store the updated contact information associated with the first party in a contact book;
  retrieving the updated contact information associated with the first party from the local incoming communication log;
  storing in the contact book the updated contact information associated with the first party;
  detecting a subsequent entry of the first communication identifier of the first party;
  presenting in response to the detecting of the subsequent entry of the first communication identifier of the first party, the updated contact information associated with the first party before initiating a second communication session;
  detecting a selection of the updated contact information of the first party; and
  initiating the second communication session responsive to the detecting of the selection of the updated contact information.

12. The machine-readable storage device of claim 11, wherein the operations further comprise:
  detecting an entry of the first communication identifier of the first party;
  detecting an availability of the updated contact information of the first party; and
  retrieving the updated contact information of the first party responsive to the detecting of the availability of the contact information of the first party.

13. The machine-readable storage device of claim 12, wherein the database corresponds to a reverse directory lookup database, and wherein the first communication identifier is selected from a group consisting of: of an E.164 number; a session initiation protocol uniform resource identifier; an email address; a short messaging system address; a multimedia messaging system address; an instant messaging address; and combinations thereof.

14. The machine-readable storage device of claim 11, wherein retrieving the contact information of the first party from the database comprises retrieving the contact information selectively in response to a policy of the first party to manage disclosure of the contact information.

15. The machine-readable storage device of claim 11, wherein the operations further comprise:
  populating fields of an entry in the contact book with the updated contact information of the first party and the communication identifier of the first party, resulting in a populated first entry of the contact book;
  presenting the populated first entry of the contact book; and
  storing the populated first entry in the contact book.

16. The machine-readable storage device of claim 11, wherein the operations further comprise:
  detecting an entry of a second communication identifier of a second party;
  receiving a request to add the second communication identifier of the second party in the contact book;
  detecting an availability of updated contact information of the second party in the local incoming communication log; and retrieving the updated contact information of the second party responsive to the detecting of the availability of the updated contact information of the second party;

populating fields of a second entry in the contact book with the contact information of the second party and the second communication identifier, resulting in a populated second entry of the contact book; and presenting the populated second entry of the contact book.

17. The machine-readable storage device of claim 11, wherein the contact information of the first party is selected from a group consisting of: a name; an address; a landline phone number; a mobile phone number, an email address; a session initiation protocol uniform resource identifier, an instant messaging address; a short messaging system address; a multimedia messaging system address; and combinations thereof, and wherein the storage device is operable in a communication device selected from a group consisting of: a landline phone; a mobile phone; a computer, a set-top box; and combinations thereof.

18. The machine-readable storage device of claim 11, wherein the storage device is operable in a communication device selected from a group consisting of: a public switched telephone network communication system; a voice over Internet protocol communication system; an Internet protocol television communication system; a cable television communication system; a satellite television communication system; an Internet protocol multimedia subsystem communication system; and combinations thereof.

19. A device, comprising:
a memory to store instructions; and
a controller coupled to the memory, wherein the controller, responsive to executing the instructions, performs operations comprising:
receiving from a communication device a first communication identifier associated with a first party, wherein the first communication identifier is sent from the communication device in response to an incoming communication originating from equipment of the first party;
retrieving contact information of the first party;
transmitting to the communication device the contact information of the first party, wherein the communication device stores the contact information of the first party and the first communication identifier of the first party as updated contact information in an incoming communication log and, in response to a request, stores the updated contact information from the incoming communication log in a contact book;
receiving, subsequently, from the communication device the first communication identifier of the first party; and
transmitting to the communication device the contact information of the first party before initiating a second communication session, wherein the communication device presents the contact information of the first party, such that selection of the contact information of the first party initiates the second communication session according to the selection of the contact information of the first party.

20. The device of claim 19, wherein the controller comprises a reverse directory lookup database, wherein the contact information is selected from a group consisting of: a name; an address; a landline phone number; a mobile phone number; an email address; a session initiation protocol uniform resource identifier; an instant messaging address; a short messaging system address; a multimedia messaging system address; and combinations thereof, and wherein the device is operable in a communication system selected from a group consisting of: a public switched telephone network communication system; a voice over Internet protocol communication system; an communication system; a cable television communication system; a satellite television communication system; an Internet protocol multimedia subsystem communication system; and combinations thereof.

21. A method, comprising:
detecting, by a communication device comprising a processor, receipt of an incoming communication originating from equipment of a first party;
recording in a local incoming communication log, a first communication identifier of the first party;
conducting, by the communication device, a reverse directory lookup of the first communication identifier, while engaging, by the communication device, in a first communication session with equipment of the first party;
retrieving, by the communication device, in response to the detecting of the receipt of the incoming communication, contact information of the first party by way of the reverse directory lookup;
storing in the local incoming communication log, updated contact information associated with the first party comprising the first communication identifier and the contact information of the first party; detecting a request to store the updated contact information associated with the first party in a contact book;
retrieving the updated contact information associated with the first party from the local incoming communication log;
storing in the contact book the updated contact information associated with the first party;
detecting, by the communication device, a subsequent entry of the first communication identifier;
presenting, by the communication device, the updated contact information associated with the first party before initiating a second communication session with equipment of the first party;
detecting, by the communication device, selection of the updated contact information of the first party; and
initiating, by the communication device, the second communication session with the equipment of the first party, according to the selection of the updated contact information of the first party.

22. The method of claim 21, wherein conducting the reverse directory lookup comprises accessing a remotely operated database.

23. The method of claim 21, comprising identifying, by the communication device, from the reverse directory lookup the first communication identifier selected from a group consisting of: a name; an address; a landline phone number; a mobile phone number; an email address; a session initiation protocol uniform resource identifier; an instant messaging address; a short messaging system address; a multimedia messaging system address; and combinations thereof.

24. The method of claim 21, wherein the communication device is selected from a group consisting of: a cordless phone; a mobile phone; a computer; and combinations thereof.

25. The method of claim 21, wherein the communication device is operable in a communication system selected from a group consisting of: a public switched telephone network communication system; a voice over Internet protocol communication system, a communication system; a cable television communication system; a satellite television communication system; an Internet protocol multimedia subsystem communication system; and combinations thereof.

* * * * *